Patented July 12, 1938

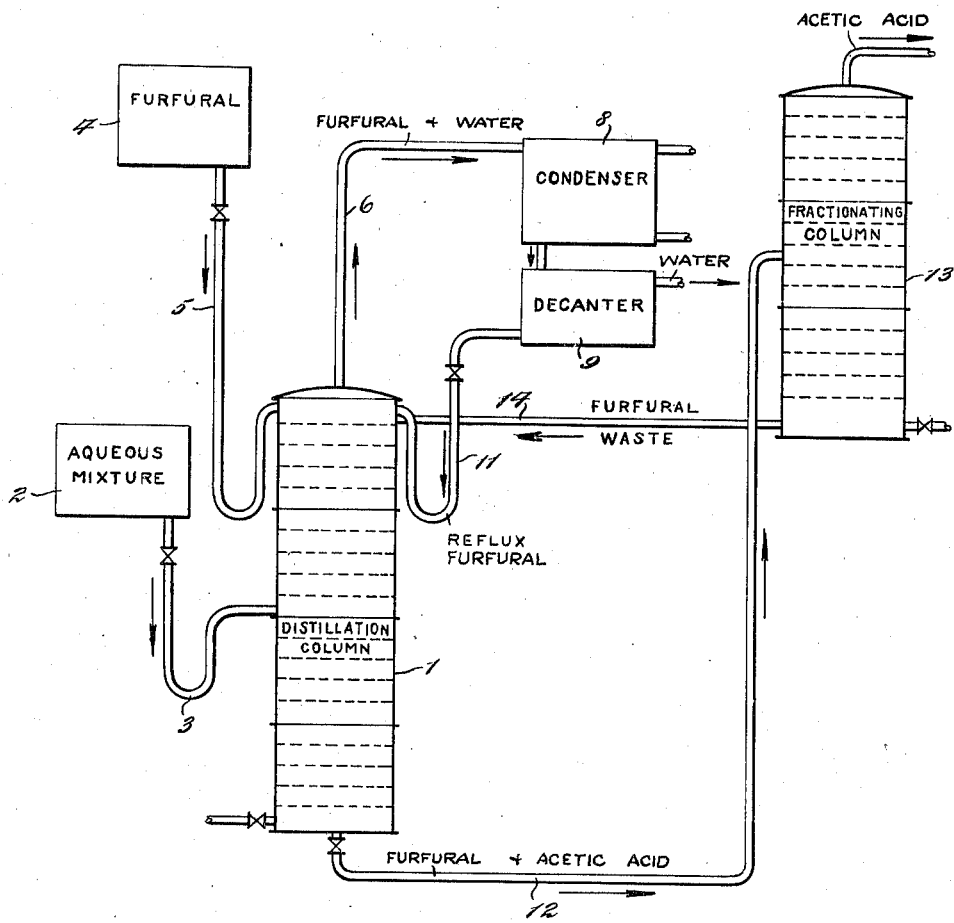

2,123,348

UNITED STATES PATENT OFFICE 2,123,348

PROCESS FOR DEHYDRATION OF AQUEOUS ACETIC ACID

Theodore O. Wentworth, Cincinnati, Ohio

Application December 16, 1936, Serial No. 116,110

4 Claims. (Cl. 202—42)

This invention relates to a process for the separation of water from solutions with acetic acid, and it may be applied either to mixtures of acetic acid with homologous acids such as formic, propionic or butyric, or to impure mixtures of acetic acid alone or mixed with any of these and containing tarry materials such as are obtained in wood distillation, or solutions containing salts of mineral acids such as are obtained in the processing of cellulose materials.

The use of many different organic liquids as entraining or withdrawing agents to form an azeotropic distillation with the water and to distill it away from the acetic acid has been described in various publications and patents. In many examples the organic material used as an entraining agent is also used in a modification of the process, as an extracting solvent. After the water removal there results the problem of separating these azeotropic withdrawing agents from the acetic acid and the methods for accomplishing this purpose have, in general, fallen in one of three classes:—

*First.*—Exemplified in Othmer United States Patent No. 1,917,391, wherein the mixture of acetic acid and ethylene chloride (formed as the result of the removal of the water and the presence of an excess amount of ethylene chloride), is separated by fractional distillation in the lower part of the distilling column used for the azeotropic distillation.

*Second.*—Exemplified in Othmer United States Patent No. 2,028,801, wherein no excess of entraining agent is allowed to exist, all of the entraining agent is removed with the water, and the pure acid is discharged from the base of the azeotropic column.

*Third.*—Exemplified in Othmer United States Patent No. 2,050,234, wherein too small an amount of entraining agent is allowed to exist in the column to remove all of the water—which, therefore, has to be separated by straight rectification in the lower part of the column.

It has been also known as described in these patents that in the use of lower boiling liquids, rather than higher boiling liquids as withdrawing agents, a larger amount of heat is required to conduct the separation, and a greater column capacity is required for a given volume of dilute acid to be handled, because of the larger amount of withdrawing liquid in the azeotropic mixture for lower boiling withdrawing liquids and hence larger amounts of vaporous heat and larger vapor volumes to be handled.

The higher the boiling point of the entraining agent the less the amount of this material in the azeotropic mixture with water, and since, in the azeotropic process the azeotropic mixture is condensed, decanted, and the withdrawing liquid layer returned to the top of the column as reflux, it is obvious that as solvents with higher boiling points are selected, a smaller and smaller amount of reflux to the top of the column is obtained. The limitations of boiling range of azeotropic withdrawing liquids which have previously been recognized have been due to the fact that a point is reached where the lessened amount of reflux available does not serve as a sufficient amount for the correct operation of the distilling column and the holding down of the acid and preventing of this discharge in the azeotropic mixture, thence in the water passing to the decanter and finally to waste.

I have found that it is possible to use furfural as an azeotropic withdrawing liquid in the process to be hereinafter described, in which process using azeotropic distillation, furfural may also be used in a separate extraction step.

One advantage of my process is that this material, furfural, hitherto thought unsuitable for use as an entraining agent may be used. A second advantage is that the acetic acid or mixture of acetic and homologous acids may be azeotropically distilled in a smaller azeotropic column than has hitherto been thought possible. A still further advantage is the possibility of regulation of the amount of the reflux liquid in the azeotropic column. Another advantage is the possibility of separating and re-using the furfural when an excess over that in the azeotropic mixture is obtained in a mixture with acetic acid and water.

Under atmospheric pressure, the temperature of the azeotropic distillation using furfural, and thus the temperature at the top of the column, is approximately 97.1° C., a higher temperature than has hitherto been utilized at the top of an azeotropic column used for the dehydration of acetic acid. On distillation of furfural with water to form an azeotropic mixture which is subsequently condensed and decanted, the upper or water layer constitutes 72% of the total volume, and the lower or furfural layer 28% of the total volume. The specific gravity of the water layer is approximately 1.0143 (21°/21°) and the specific gravity of the furfural layer is approximately 1.1517 (21°/21°).

The weight relations thus are seen to be approximately 69.3% in the upper layer and 30.7% in the lower or furfural layer. These layers are, of course, approximately those which are obtained from the decanter beneath the condenser which surmounts an azeotropic column. The solubility of furfural in water at 20° C. is approximately 8.3% by weight and of water in furfural 4.8%.

If these figures are combined with the data on the amount in each layer and proper corrections applied, it will be seen that the constant boiling mixture such as would be obtained at the head of an azeotropic column is approximately 35% furfural by weight and 65% water by weight.

In the usual operation of an azeotropic system for separating acetic acid and water, the water and withdrawing agent distilled over the top of the column in a constant boiling mixture are condensed, the condensate decanted, and the water layer discharged to waste or to a small stripping column, the withdrawing layer returned to the head of the column as a reflux and the acetic acid discharged from the base of the column. When an azeotropic system is operated in this manner with furfural, the amount of acid which is distilled over the head of the column amounts to too high an amount to be economically discarded. This is because of the relatively small percent of furfural in the azeotropic mixture and hence the small amount available for reflux in the column, which amount is insufficient to hold down the higher boiling component (acetic acid) as is well known to be the function of a distilling column operating with and requiring a suitable amount of reflux liquid.

I have found that by adding an additional amount of furfural over that received from the decanter to the top plate of the column to act as additional reflux, the system may be operated very efficiently with a reduction of the amount of acid in the water discharged from the decanter to a very low value which value decreases as the amount of additional furfural increases. The introduction of this excess furfural as reflux into the azeotropic column system allows this excess furfural to run down the column while accomplishing the usual function of reflux in a distilling column (i. e., the holding down of the less volatile component of the mixture being separated). This additional furfural ultimately discharges from the base of the column with the anhydrous or nearly anhydrous acid. The bottom temperature of the column will thus be at some temperature between 118°, the boiling point of acetic acid, and 164°, the boiling point of furfural, depending on the ratio of acetic acid and furfural in this mixture.

I have found that in the case where, for example, an aqueous solution containing 30% acetic acid is to be concentrated, an amount of furfural may be added to the top of the azeotropic column in addition to the amount returned from the decanter about equal to the amount of acetic acid in the original solution. This means that this excess furfural settles to the bottom of the column together with the nearly, or completely, anhydrous acid—and in about equivalent amount. The boiling temperature at the bottom of this azeotropic column will then be approximately 130° C. which is the boiling point of a solution containing approximately equivalent amounts of acetic acid and furfural. Preferably, there is very little water in this mixture, which anhydrous or nearly anhydrous condition may be readily obtained due to the well known dehydrating action of this azeotropic process and column.

It is now necessary to separate this mixture of acetic acid and furfural, and I have found it possible to separate acetic acid from furfural very simply in a standard type fractionating column with the acetic acid discharged from the top practically free of furfural and the furfural discharged from the base of the column free of acetic acid.

The furfural discharged from the base of this second column is thus in a state suitable for re-addition to the top of the azeotropic column. A cycle may thus be established with (1) dilute acetic acid being fed either in a vaporous or liquid state to a mid-point of the azeotropic column in which furfural acts in the known manner as an azeotropic withdrawing agent; (2) water being discharged from the decanter to and through the standard stripping column; (3) excess furfural over that in the azeotropic mixture cycling to the top of the azeotropic column as additional reflux down through the azeotropic system, out with the concentrated acid, then (4) being separated from the acetic acid in the furfural-acetic column; (5) being returned back to the top of the azeotropic system to be used as reflux for a subsequent cycle and (6) acetic acid being discharged from the fractionating system at the top of the furfural-acetic column.

In the schematic figure, I have shown a distillation column at 1, this being a steam inlet pipe, the aqueous mixture being led from tank 2 to the distillation column via pipe 3. The furfural passes from tank 4 through pipe 5 into the distillation column. 8 is a condenser receiving the water and entraining agent distillate over the top of the column, the condensate passing to decanter 9 and the water layer being discharged to waste. The withdrawing layer is passed from the decanter through pipe 11 to the top of the column as a reflux and the mixture of acetic acid and furfural is removed from the bottom of the column and passed through pipe 12 to fractionating column 13, the acetic acid being discharged from the top and the furfural discharged from the base, the cycle being completed by passing the furfural or a desired part thereof through pipe 14 to constitute the excess furfural over that in the azeotropic mixture in column 1.

Suitable additions to this system may be employed such as a heat interchanger for recovering the sensible heat in the furfural discharged from the base of the furfural-acetic column at approximately 164° C., the boiling point of furfural. The heat interchanger may serve to preheat liquid fed into the system and to reduce the temperature of the furfural to a temperature not greatly different from that existing at the top of the azeotropic column. Another heat interchanger may be incorporated to utilize the heat of the water discharged from the base of the stripping column which is at approximately the normal boiling point. Storage tanks may be placed in the circuit, particularly one for a reservoir for the furfural and also one for a reservoir for the mixture of acetic acid and furfural discharged from the azeotropic column.

A suitable amount of the excess furfural over that in the azeotropic ratio which is added to the top plate of the azeotropic column—and thence cycled in the system described—is from 0.5 to 5.0 times the amount present in the azeotropic ratio, and thus returned to the column head from the decanter.

I have also found that a continuous distillation of this type may cause a very slight decomposition of the furfural and the degradation productions are usually solids which may be removed by a filtration. These solids collect in the liquid, leaving the base of the furfural-acetic column and may be removed by filtering the furfural before recycling.

I have also found that the rate of decomposition of furfural is negligibly small when the system is operated under an absolute pressure of not more than 5 lbs. per square inch. Since the higher temperatures are encountered in the furfural-acetic column, I have found that it is particularly desirable to operate this column under vacuum even though the azeotropic column is operated at atmospheric pressure.

The decomposition of furfural results in products which are insoluble in furfural and may be filtered off. In the usual case, and at the present low price of furfural, which is a very cheap chemical material, it is not necessary to operate under vacuum conditions in either column, and the very slight loss of furfural due to decomposition under atmospheric boiling conditions may be economically replaced more cheaply than the expense attending larger columns for taking care of the increased vapor volumes at sub-atmospheric pressures, the expense of maintaining exhausters, etc., but in the event that furfural should become an expensive commodity, the use of the vacuum system to eliminate the small amount of decomposition may be advisable.

I have also found that it is often desirable to introduce the dilute acetic acid into the azeotropic column as a vapor and by evaporating the aqueous acid to be handled in a separate boiler or still and supplying the resulting vapors to the dehydrating system, solid or non-volatile impurities present, due to original state of the dilute acid, are eliminated and the danger of fouling the dehydrating system is minimized.

Under some conditions, I have found that it is desirable and economical to combine with the azeotropic distillation a preliminary extraction operation of the aqueous acetic acid also using furfural.

Furfural has a very favorable distribution coefficient, i. e., the percentage of acetic acid in a furfural layer is approximately the same as the percentage acetic acid in a water layer in contact therewith. This is very good, considering that most acetic acid extractants hitherto used which have the high boiling range of furfural usually have much lower distribution coefficients.

Since furfural is heavier than water or aqueous acetic acid, it will usually be passed countercurrently downwardly against the rising stream of aqueous acid in any extraction process in contradistinction to the usual practice of passing solvents upwardly against a descending stream of aqueous acid. I have also found that it is desirable to carry out this liquid-liquid extraction prior to the azeotropic distillation at as low a temperature as practical.

For example, in the handling of the 30% aqueous acid above mentioned, I have found that by the use of an efficient extractor and using approximately twice as much furfural as aqueous acetic acid, it is possible to remove all but about 0.1% acetic acid from the watery layer leaving the extractor. The furfural layer thus discharged contains about 15% acetic acid and from 5 to 7% water. By means of this extraction step, the ratio of acetic acid to acetic acid plus water has thus been increased from about 30% to between 68 and 75%. This mixture is then fed to the middle point of the azeotropic distilling column, the operation of which has been previously described, and the water separated from the acetic acid and furfural therein by the azeotropic distillation. The acetic acid-furfural mixture from the base of the azeotropic column is then fractionated to separate the concentrated acetic acid and furfural, which material is divided with part going to the extracting operation and part to the head of the distilling column.

When handling various mixtures of the homologous fatty acids, the water separation may be accomplished and subsequent separation of the homologues accomplished according to known methods.

Many other modifications of this system will be apparent to those skilled in the art of distilling and recovering acetic acid.

Having described my invention, what I claim and desire to secure by Letters Patent, is as follows:—

1. In the process of dehydrating aqueous acetic acid by an azeotropic distillation thereof in a column still, the steps of introducing furfural as the water entraining agent, condensing the water and furfural distilled over the top of the column, decanting the condensate and returning the furfural to the head of the column as reflux, and adding an additional amount of furfural to the head of the column as additional reflux, above that required for the azeotropic mixture and sufficient to hold down the acid to produce substantially acid-free water at the top of the column.

2. In the process of dehydrating aqueous acetic acid by an azeotropic distillation thereof in a column still, the steps of introducing furfural as the water entraining agent, condensing the water and furfural distilled over the top of the column, decanting the condensate and returning the furfural to the head of the column as reflux, adding an additional amount of furfural to the head of the column as additional reflux, the amount of said additional furfural added to the reflux at the head of the column being approximately equal to the amount of acetic acid originally in the aqueous solution under treatment.

3. In the process of dehydrating aqueous acetic acid by an azeotropic distillation thereof in a column still, the steps of introducing the aqueous acetic acid to a mid-point of the column, introducing furfural to the head of the column, condensing the furfural-water vapors distilled over the column and removing the water, recycling the condensed furfural, introducing added furfural over that in the azeotropic mixture to the top of the column, and sufficient to hold down the acid to produce substantially acid-free water at the top of the column, withdrawing said excess furfural from the base of the column with the concentrated acetic acid, rectifying said added furfural from the acetic acid in a rectifying column, and recycling said added furfural.

4. A process of dehydrating aqueous acetic acid in accordance with claim 3, in which the added furfural over that in the azeotropic ratio which is recycled, is from 0.5 to 5.0 times that present in the said azeotropic ratio.

THEODORE O. WENTWORTH.